United States Patent [19]

Sakuragi et al.

[11] Patent Number: 5,649,775
[45] Date of Patent: Jul. 22, 1997

[54] TAPE PRINTING APPARATUS

[75] Inventors: Shoji Sakuragi, Nagoya; Shiro Yamada, Kasugai; Minako Ishida, Ama-gun; Hideo Ueno, Nagoya, all of Japan

[73] Assignee: Brother Kogyo Kabushiki Kaisha, Aichi-ken, Japan

[21] Appl. No.: 332,080

[22] Filed: Nov. 1, 1994

[30] Foreign Application Priority Data

Nov. 4, 1993 [JP] Japan ................................. 5-301130

[51] Int. Cl.$^6$ ............................................. B41J 3/39
[52] U.S. Cl. ................................. 400/615.2; 400/61
[58] Field of Search ........................ 400/61, 615.2, 400/76, 83

[56] References Cited

U.S. PATENT DOCUMENTS

| 5,066,152 | 11/1991 | Kuzuya et al. | 400/621 |
| 5,188,469 | 2/1993 | Nagao et al. | 400/615.2 |
| 5,322,375 | 6/1994 | Niwa et al. | 400/61 |

FOREIGN PATENT DOCUMENTS

| 497352 | 8/1992 | European Pat. Off. | 400/615.2 |
| 1-85050 | 6/1989 | Japan | 700/615.2 |
| 2-106555 | 4/1990 | Japan | 400/615.2 |
| 096790 | 4/1993 | Japan | 400/615.2 |

Primary Examiner—Edgar S. Burr
Assistant Examiner—Steven S. Kelley
Attorney, Agent, or Firm—Oliff & Berridge

[57] ABSTRACT

After document data have been inputted by operating character keys, if an automatic setting key is operated to allow the print character size to be set automatically and a print key is then operated, printing process control is executed and the greatest character size printable on a tape mounted in the tape printing apparatus is set (S33), a base line position shifting process is performed so that the character is positioned around the center of the width of the tape (S34). Then, dot image data in the print character size that is set on the basis of the document data is generated (S31) and the dot image data is output to the printing mechanism to be printed on the tape (S32).

24 Claims, 12 Drawing Sheets

| TAPE WIDTH (mm) | PRINTABLE WIDTH (PW) (DOTS) | CHARACTER SIZE (DOTS) |
|---|---|---|
| 6 | 32 | 32 |
| 9 | 48 | 48 |
| 12 | 56 | 48 |
| 18 | 96 | 96 |
| 24 | 96 | 96 |

| CHARACTERS | CHARACTER SIZE (DOTS) | | | | | | |
|---|---|---|---|---|---|---|---|
| | 16 | 24 | 32 | 48 | 64 | 96 | 128 |
| A | 11 | 16 | 20 | 32 | 42 | 66 | 85 |
| B | 11 | 16 | 20 | 32 | 42 | 66 | 85 |
| G | 11 | 16 | 20 | 33 | 43 | 68 | 88 |
| H | 11 | 16 | 20 | 32 | 42 | 66 | 85 |
| I | 11 | 16 | 20 | 32 | 42 | 66 | 85 |
| Z | 11 | 16 | 20 | 32 | 42 | 66 | 85 |
| a | 8 | 12 | 15 | 24 | 31 | 48 | 63 |
| b | 11 | 16 | 20 | 32 | 42 | 66 | 85 |
| g | 8 | 12 | 15 | 24 | 31 | 49 | 64 |
| h | 11 | 16 | 20 | 32 | 42 | 66 | 85 |
| i | 11 | 16 | 20 | 32 | 42 | 66 | 85 |
| z | 8 | 12 | 15 | 24 | 31 | 48 | 63 |

TAPE PRINTING APPARATUS

BACKGROUND OF THE INVENTION

1. Field of the Invention

The invention relates to a tape printing apparatus for printing desired characters such as letters and symbols onto a tape, and more particularly, to a tape printing apparatus of a type capable of printing characters onto a tape so that the characters may be aligned along a longitudinal direction of the tape.

2. Description of the Related Art

U.S. Pat. No. 5,061,152 has proposed a tape printing apparatus, in which a font ROM incorporated in its controller stores dot pattern data of plural classes of character sizes. An operator operates the tape printing apparatus to input characters such as letters and symbols desired to be printed on a tape (desired document) and to designate a character size, with which the characters are desired to be printed. In the present specification, various characters, such as alphanumeric characters and letters, i.e., alphabetic characters and letters ("a", "B" . . . , for example) and numeric characters ("1", "2", . . . , for example), other kinds of characters and letters, such as hieroglyph letters, various symbols, such as "♂", "♀", etc., and other kinds of various characters and letters to be printed on a tape are all referred to as "characters." The tape printing apparatus prints the inputted characters onto a tape (printing medium) which has a width of 10 mm, 24 mm, or the like so that the characters are aligned along the longitudinal direction of the tape. The tape printing apparatus is further provided with various editing functions.

The size of the characters constituting the document is restricted or limited by the width of the tape, onto which the document is desired to be printed. Accordingly, the operator has to designate the character size, dependently on the width of the tape to be printed with the desired characters.

Generally, in order to print alphabetic characters, including capital letters and small letters, onto a tape, a base line is defined to extend in the longitudinal direction of the tape. All the capital letters of alphabetic characters are printed to be aligned along the base line with their bottom points being located on the base line. In other words, an entire part of each of the capital letters is located just on the base line, and no part of the capital letter protrudes down from the base line. Similarly, some of the small letters, such as "a" and "b", are printed to be aligned along the base line with their bottom being located on the base line to have no part protruding down from the base line. These small letters and capital letters are referred to as "non-protruding characters," hereinafter. Some other small letters, such as "g" and "j", are printed to be aligned along the base line with their bottom portions protruding down from the base line. These letters will be referred to as "protruding characters," hereinafter.

Conventionally, in order to print alphabetic characters onto a tape, the base line is defined to be located in a position close to but somewhat lowered from the center of the width of the tape, regardless of the designated character size, in order that the protruding characters can be properly printed together with the capital letters and the non-protruding characters.

SUMMARY OF THE INVENTION

According to this conventional method, the base line is always set in the position close to and somewhat lower than the center of the width of the tape, regardless of whether the inputted alphabetic characters include protruding characters or not. Accordingly, when a train of alphabetic characters formed of only non-protruding characters (such as a title formed of only capital letters and a document formed of only the capital letters and the non-protruding small letters) are inputted as a document to be printed and a large character size is designated for the document, the document is printed on the tape with a margin left under the base line being excessively large relative to a margin left above the characters. Therefore, the resultant print does not appear nice. Additionally, because this large margin is inevitably left under the base line, it is impossible to print characters in a greater character size with such a margin eliminated.

It is therefore, an object of the present invention to overcome the above-described conventional drawbacks, and to provide a tape printing apparatus capable of printing characters, when all of the alphabetic characters constituting an inputted document are the non-protruding letters, with effectively using the tape width, in as great a character size as possible, and not leaving an excessive margin. With the tape printing apparatus, it is possible to print the inputted characters in the greatest character size printable on a tape as a printing medium.

In order to attain the above object and other objects, the present invention provides a tape printing apparatus for printing a desired character onto a tape, the apparatus comprising: input means for inputting code data indicative of at least one character desired to be printed on a tape and various commands; data storage means for temporarily storing the inputted code data of the desired at least one character; font storage means for storing data indicative of shapes of a number of characters, code data of which are inputtable by the input means, in plural classes of character sizes; character judging means for judging whether all the desired at least one character stored in the data storage means is a non-protruding character which has no portions that are to protrude down from a base line; print character size setting means for receiving the result of the judgement by the character judging means and for setting the greatest character size printable in a tape having a tape width, if all the desired at least one character stored in the data storage means is a non-protruding character; print data generation means for generating dot image data for printing, on the basis of the code data stored in the data storage means, the character size set by the print character size setting means and the data stored in the font storage means; and print means for receiving the dot image data for printing from the print data generation means and for printing the data on the tape.

The tape printing apparatus may further comprise base line position calculation means for calculating a position of a base line, on which the desired at least one character is to be located, based on the character size set by the print character size setting means, so that an upper margin and a lower margin to be left above and below the desired at least one character become substantially equal to each other. The print data generation means may generate the dot image data for printing, on the basis of the calculated base line position, the code data stored in the data storage means, the character size set by the print character size setting means, and the data stored in the font storage means.

The tape printing apparatus may further comprise: a tape cassette receiving means for receiving a tape cassette containing a tape with a tape width; and tape-width detection means for detecting the tape width of the tape contained in the tape cassette actually received in the tape cassette receiving means. The print character size setting means may set the greatest character size printable in the tape width detected by the tape-width detection means when all the desired at least one character stored in the data storage means is detected to be the non-protruding character.

According to another aspect, the present invention provides a tape printing apparatus for printing desired characters onto a tape, the apparatus comprising: an input unit for inputting data of at least one character desired to be printed on a tape and various commands; a data memory for temporarily storing the inputted data of the at least one character; a font memory for storing data indicative of shapes, in plural classes of character sizes, of a number of characters, data of which are inputtable by the input unit; a character size setting manner selection unit for selecting one of a manual setting mode for manually setting a character size, with which the at least one character is desired to be printed, and an automatic setting mode for automatically setting the character size; a tape-width detection unit for detecting a tape width of a tape, onto which the at least one character is desired to be printed, the tape-width detection unit being operated only in the automatic setting mode; a character discrimination unit for discriminating between non-protruding characters and protruding characters among the at least one character stored in the data memory, the character discrimination unit being operated only in the automatic setting mode; an automatic character size setting unit for receiving the result of discrimination from the character discrimination unit and for setting the greatest character size printable in the tape width detected by the tape-width detection unit when the at least one character stored in the data storage means are all non-protruding characters, the automatic character size setting unit being operated only in the automatic setting mode; a base line calculation unit for calculating a position of a base line, on which the at least one character is to be located, on the basis of the character size set either in the selected manual setting mode and in the automatic setting mode by the automatic character size setting unit; a print data generation unit for generating dot image data for the inputted at least one character, on the basis of the character size set either in the selected manual setting mode and in the automatic setting mode by the automatic character size setting unit, the calculated base line, the data stored in the data memory and the data stored in the font memory; and a print unit for receiving the dot image data for printing from the print data generation unit and for printing the data on the tape.

BRIEF DESCRIPTION OF THE DRAWINGS

The above and other objects, features and advantages of the invention will become more apparent from reading the following description of the preferred embodiment taken in connection with the accompanying drawings in which:

FIG. 6 is a table showing content set in a standard character height table;

DETAILED DESCRIPTION OF THE PREFERRED EMBODIMENT

Figure 1:
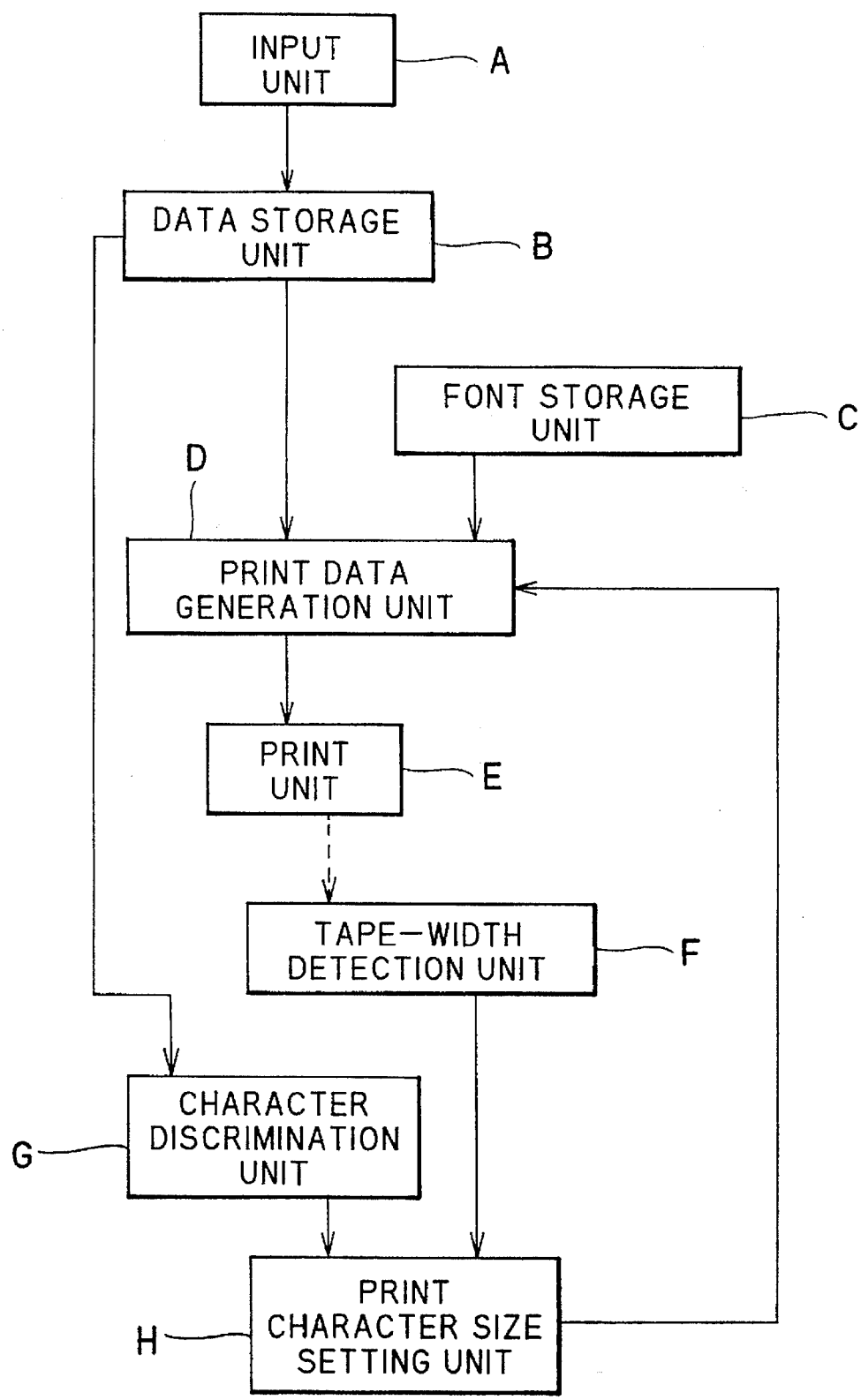
FIG. 1 is a functional block diagram showing the structure of an embodiment of the present invention.

A tape printing apparatus according to a preferred embodiment of the present invention will be described while referring to the accompanying drawings wherein like parts and components are designated by the same reference numerals to avoid duplicating description.

As shown in a functional block diagram of FIG. 1, in a tape printing apparatus of a preferred embodiment of the present invention, an input unit A is provided for inputting a desired document data consisting of characters of alphabetic characters and symbols, and various commands. A data storage unit B is provided for temporarily storing the inputted document data of alphabetic characters and symbols. A font storage unit C is provided for storing dot pattern data or outline data in plural classes of character sizes for a number of alphabetical characters and symbols inputtable by the input unit A. A print data generation unit D is provided for generating dot image data for printing, on the basis of the document data stored in the data storage unit B and data stored in the font storage unit C. A print unit E is provided for receiving the dot image data for printing produced in the print data generation unit D and for printing the data on a tape as a printing medium. According to the present invention, a tape-width detection unit F is further provided for detecting the tape width of the tape desired to be printed with the inputted document. A character discrimination unit G is provided for discriminating between non-protruding characters, which have no parts protruding down from the base line, and protruding characters, which have parts protruding down from the base line, among the alphabetical characters of the inputted document stored in the data storage unit B. A print character size setting unit H is provided for receiving the result of discrimination from the character discrimination unit G and for setting the greatest character size printable in the tape width detected by the tape-width detection unit F when the alphabetical characters stored in the data storage means are all non-protruding characters and for instructing the print data generation unit D to generate dot image data in the thus set greatest character size.

In the tape printing apparatus with the above-described structure, the tape-width detection unit F detects the tape width of a tape. The character discrimination unit G discriminates between the non-protruding characters and the protruding characters, among the alphabetical characters stored in the data storage unit B. When the alphabetical characters stored in the data storage unit B are all non-protruding characters according to the results of discrimination from the character discrimination unit B, the print character size setting unit H sets the greatest character size printable in the tape width detected by the tape-width detection unit F, and instructs the print data generation unit D to generate dot image data in the set character size. Thus, on the basis of data from the data storage unit B and data from the font storage unit C, the print data generation unit D generates the dot image data for printing in the set print character size, while not producing an excessive margin under the base line. The dot image data for printing is printed by the print unit E on the tape. More specifically, when the alphabetical characters constituting the inputted document are all non-protruding characters, the dot image data is generated for printing the document data, by shifting the base line to a lower level so that the greatest character size printable in the tape width is printed without leaving an excessive margin under the base line. Accordingly, a document formed of only the non-protruding characters can be printed with the tape width effectively used, in as great a character size as possible, and so as to look nice.

A concrete example of this embodiment will be described below with reference to FIGS. 2 through 17.

This example is an application of the embodiment to a tape printing apparatus designed exclusively for English language and capable of printing on a print tape a plurality of characters such as alphabetic characters and symbols as well as bar codes.

This tape printing apparatus can print characters of a plurality of typefaces (such as Gothic type and Ming-cho type). This apparatus can print characters of each typeface with different seven print character sizes PS (16, 24, 32, 48, 64, 96, and 128 dot sizes). In each print character size PS, the standard character height SH is given for each of all the alphabetical characters of capital letters "A"–"Z" and small letters "a"–"z". This standard character height SH is defined for each character of each character size, as the height (the number of dots) from the base line to the top alignment level, of each character of each character size.

Similarly, in each print character size PS, the standard character protrusion amount PA is given for each of the protruding alphabetic characters among all the alphabetic characters. This standard character protrusion amount PA is defined for each protruding character of each character size, as the protrusion amount (the number of dots) from the base line to the bottom alignment level. It is noted that the protrusion amounts PA for all the protruding characters of each print character size PS are the same values, for example.

Figure 2:
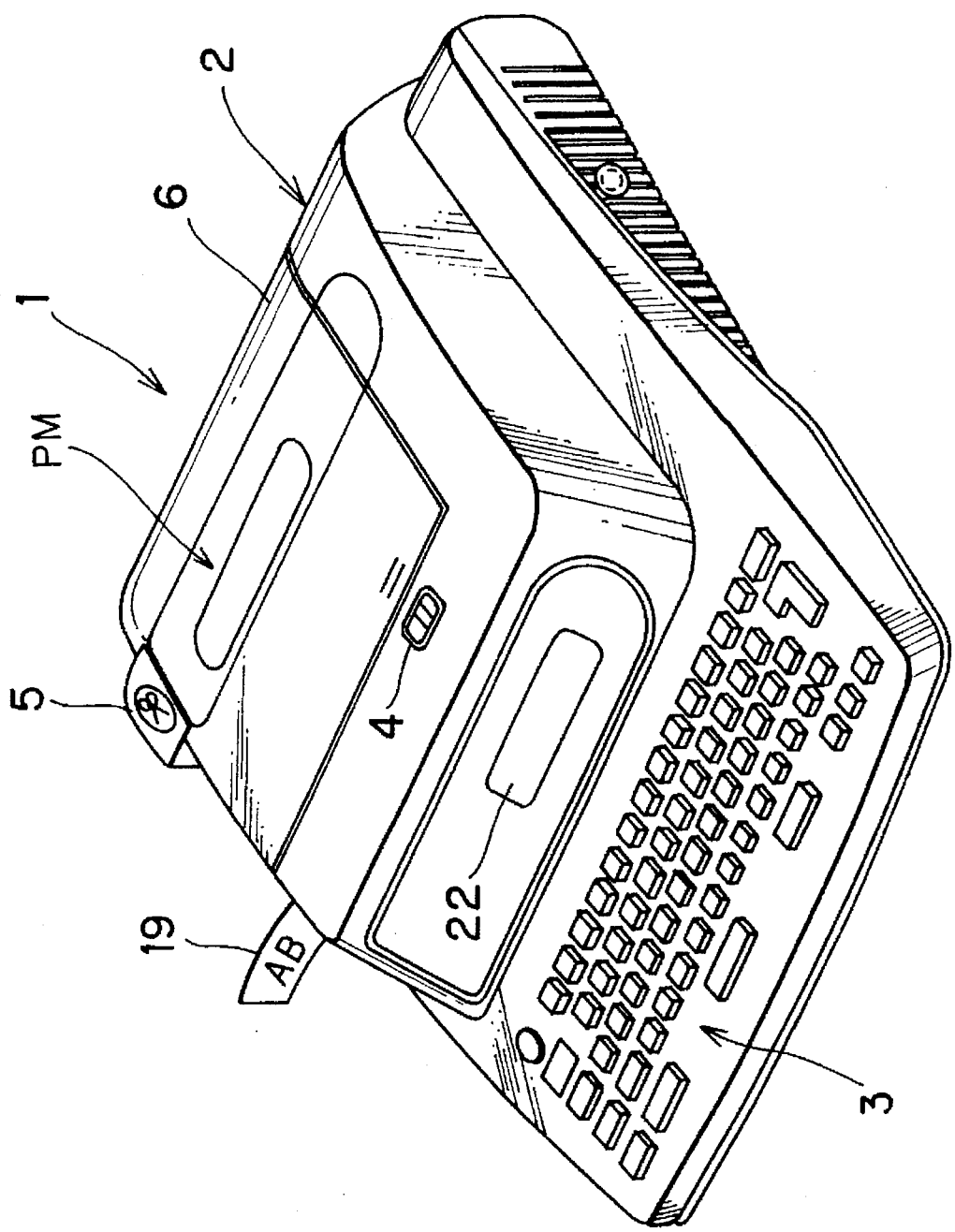
FIG. 2 is a perspective view of a tape printing apparatus of a concrete example of the embodiment of the present invention.

As shown in FIG. 2, a keyboard 3 is disposed in front of a body frame 2 of a tape printing apparatus 1, a printing mechanism PM is provided at the rear of the keyboard 3 and within the body frame 2, and a liquid crystal display 22 capable of displaying characters and symbols is disposed just behind the keyboard 3. Reference numeral 4 denotes a release button for opening a cover frame 6 when a tape containing cassette CS, to be loaded in the printing mechanism PM, is put in or removed. Reference numeral 5 denotes a cut operating button for manually cutting a print tape 19.

On the keyboard 3, there are arranged such keys as character keys for inputting code data of alphabetic characters, numeric characters, and symbols constituting a document desired to be printed, a space key, a return key, cursor moving keys for moving a cursor K to the right and left, a size setting key for starting setting of the size of the characters to be printed, six character size keys for manually setting the desired character size into the six print character sizes (16-, 24-, 32-, 48-, 64-, and 96-dot sizes), respectively, an automatic character size setting key for automatically setting the character size according to the tape width of the print tape 19, a print key for commanding printing, an execution key for finalizing various types of setting, and a power key for turning power on/off.

Figure 3A:
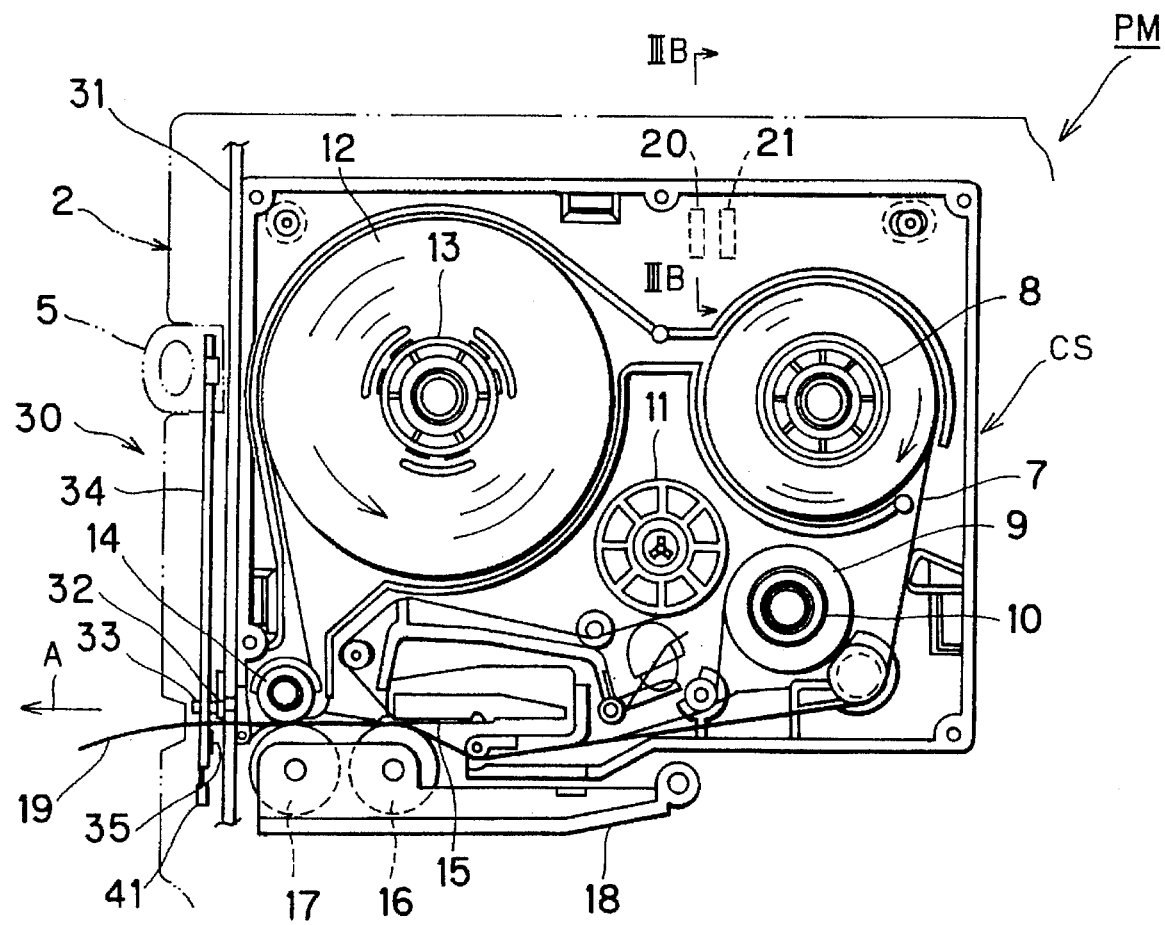
FIG. 3A is a schematic plan view of a printing mechanism PM formed in the tape printing apparatus of FIG. 2.

Referring to FIG. 3A, the printing mechanism PM will be described in detail. The rectangular, tape containing cassette CS is removably loaded in the printing mechanism PM. Within the tape containing cassette CS, there are rotatably provided a tape spool 8 around which a transparent laminate film 7 is wound, a ribbon supply spool 10 around which a print ribbon 9 is wound, a take-up spool 11 for taking up the print ribbon 9, a supply spool 13 around which a double coated tape 12 with the same width as the laminate film 7 is wound with its peeling paper on the outside, and a joining roller 14 for causing the double-coated tape 12 to adhere to the laminate film 7. The double-coated tape 12 is a tape having adhesive layers formed on both sides of its base tape and having peeling paper attached to the adhesive layer on one side.

A thermal head 15 is installed upright in the position where the laminate film 7 and the print ribbon 9 overlap each other. A platen roller 16 for pressing the laminate film 7 and the print ribbon 9 against the thermal head 15 and a feed roller 17 for pressing the laminate film 7 and the double coated tape 12 against the joining roller 14 to thereby form the print tape 19 are pivotally supported for rotation on a support member 18 which is pivotally mounted for rotation on the body frame 2. On the thermal head 15, there is provided a group of heating elements formed of a train of 128 heating elements arranged in the vertical direction.

Accordingly, when electric current is passed through the heating elements while the joining roller 14 and the take-up spool 11 are driven in their predetermined rotating direction in synchronism with each other by rotation of a tape feed motor 47 (refer to FIG. 4) in its predetermined rotating direction, characters, symbols, and bar codes are printed on the laminate film 7 with plural trains of dots. Then, the double coated tape 12 is attached to the laminate film 7 and the tape is fed, as the print tape 19, in the tape feeding direction A to be discharged from the body frame 2 as shown in FIGS. 2 and 3. Details of the printing mechanism PM are described in U.S. Pat. No. 5,188,469, the disclosure of which is hereby incorporated by reference.

Referring now to FIG. 3A, a manual cutting mechanism 30 for cutting the print tape 19 will be described in detail below. Just inside the body frame 2, there is provided a plate-formed auxiliary frame 31 in upright position and a stationary blade 32 is fixedly attached to the auxiliary frame 31 so as to face in an upward direction. An operating lever 34 extended in the direction from front to rear is supported for rotation, at its portion closer to the front end, on a pivot shaft 33 fixedly attached to the auxiliary frame 31. A movable blade 35 is fixedly attached to the operating lever 34 in front of the pivot shaft 33 such that it opposes the stationary blade 32. The rear end portion of the operating lever 34 is positioned under the cut operating button 5. Normally, the operating lever 34 is resiliently urged by a spring member, not shown, in the direction to separate the movable blade 35 from the stationary blade 32. A cut switch 41 is attached to the front end of the operating lever 34 for detecting the rotation of the operating lever 34 for cutting a tape caused by the cut operating button 5 depressed.

The print tape 19 having a document printed thereon passes through the space between the stationary blade 32 and the movable blade 35 and sticks out of the body frame 2. Then, if the cut operating button 5 is pressed down, the movable blade 35 is caused to approach the stationary blade 32 by the movement of the operating lever 34 and, then, the print tape 19 is cut by the blades 32 and 35.

As the print tape 19 to be fed from the tape containing cassette CS (i.e., the double-coated tape 12 and the laminate film 7 mounted in the cassette CS), there are provided those of five tape widths, 6 mm, 9 mm, 12 mm, 18 mm, and 24 mm. Further, for each of the tape width, there are provided a plurality of tape cassettes having arbitrary combinations of colors, black, red, blue, yellow, . . . , white, of the color of the double-coated tape 12 which will become the background color and of the color of the ink of the print ribbon 9 which will become the color of the characters and the like.

On the bottom wall of each tape containing cassette CS, there are provided a first projecting piece 20 and a second projecting piece 21. The first projecting piece 20 formed on each tape cassette CS is for indicating a tape width of a tape 19 to be obtained from the tape cassette CS, i.e., the width of the double-coated tape 12 and the laminate film 7 mounted in the cassette CS. Because the width is one of the five tape widths, the first projecting piece 20 formed on each tape cassette CS is formed of three projecting claws, for distinguishing in combination one from the five tape widths. The second projecting piece 21 formed on each tape cassette CS is for indicating a combination of the colors of the double-coated tape 12 and the print ribbon 9 mounted in the cassette CS. Because this color combination is one of the plurality of color combinations, the second projecting piece 21 formed on each tape cassette CS is formed of five projecting claws for discriminating in combination one from the plural color combinations.

Figures 4, 5:
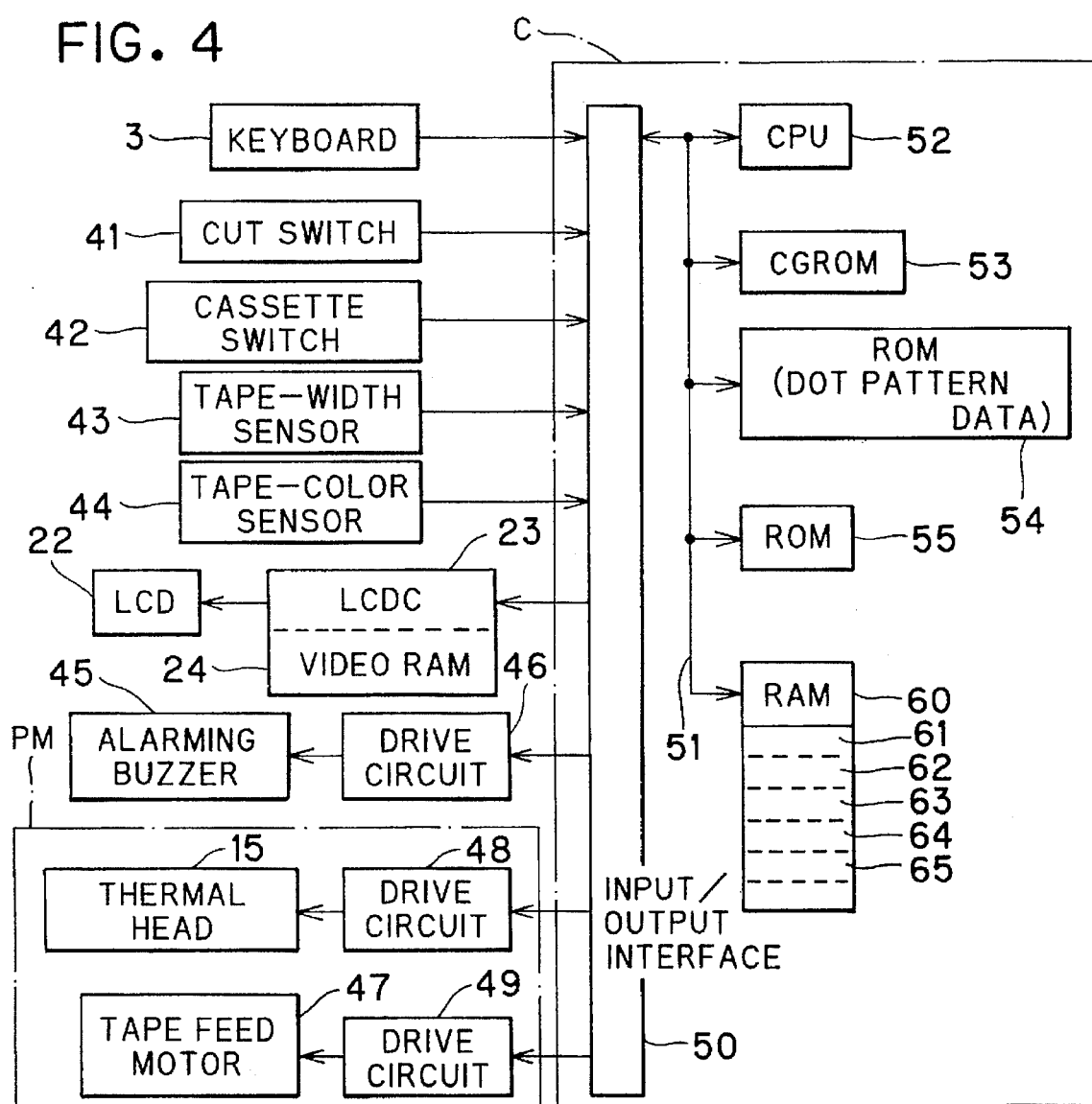
FIG. 4 is a block diagram of the control system of the tape printing apparat.
FIG. 5 is a table showing content set in a most suitable character size table.
Figure 7:
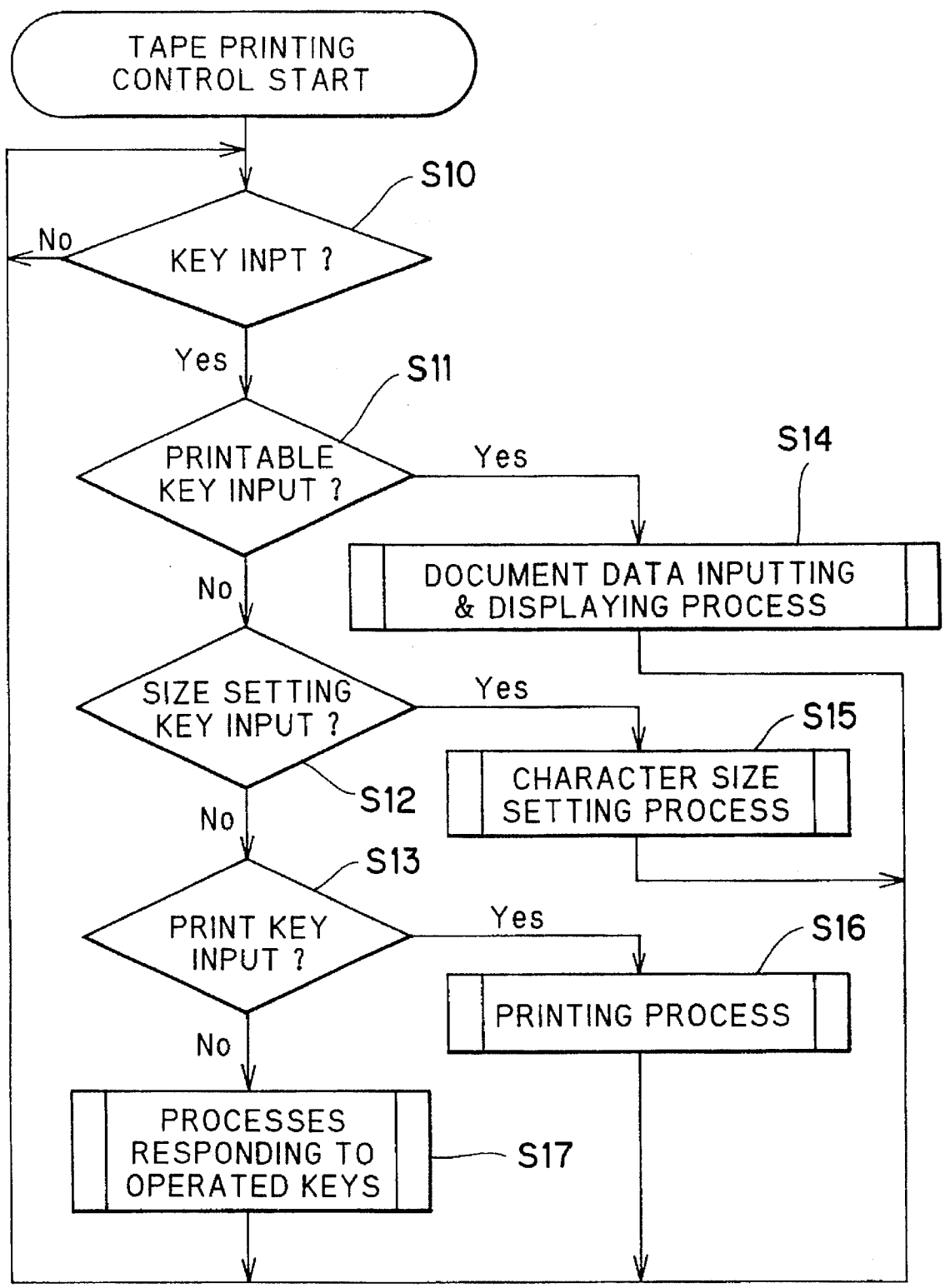
FIG. 7 is a schematic flowchart of a tape printing control routine.

As shown in FIG. 4, on the body frame 2, there are provided a tape-width sensor 43 and a tape-color sensor 44 at positions that the sensors 43 and 44 may confront the projecting pieces 20 and 21, respectively, when the tape cassette CS is loaded in the printing mechanism portion PM. The tape-width sensor 43 is for detecting the condition of the projecting claws of the first projecting piece 20 to thereby detect the tape width of a tape to be obtained from the tape cassette CS actually loaded in the printing mechanism portion PM. The tape-color sensor 44 is for detecting the condition of the projecting claws of the second projecting piece 21 to thereby detect the combination of the colors of the double-coated tape 12 and print ribbon 9 mounted in the tape cassette CS actually loaded in the printing mechanism portion PM.

Figure 3B:
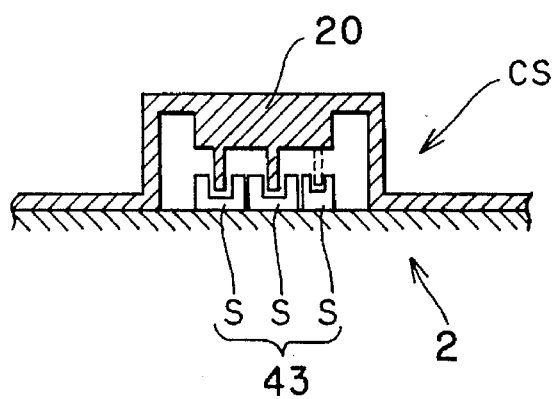
FIG. 3B is a schematic sectional view taken along a line IIIB—IIIB in FIG. 3A.

As shown in FIG. 3B, the tape-width sensor 43 is made from three photocouplers S, each having a light-emitting diode paired with a photodetector. Each of the three photocouplers is located at a position capable of receiving a corresponding one of the three projecting claws of the first projecting piece 20. Each photosensor therefore detects whether or not the corresponding projecting claw is inserted between the light-emitting diode and the photodetector.

Similarly, the tape-color sensor 44 is made from five photocouplers S, each being located at a position capable of receiving a corresponding one of the five projecting claws of the second projecting piece 21 for detecting whether or not the corresponding projecting claw is inserted between the light-emitting diode and the photodetector.

Further, on the body frame 2, there is provided a cassette switch 42 (refer to FIG. 4) for detecting that a cassette selected from the various kinds of tape containing cassettes CS has been loaded.

The control system of the tape printing apparatus 1 is structured as shown in the block diagram of FIG. 4.

An input/output interface 50 of a controller C is connected with the keyboard 3, the cut switch 41, the cassette switch 42, the tape-width sensor 43, the tape-color sensor 44, a display controller (LCDC) 23 having a video RAM 24 for outputting display data to the liquid crystal display (LCD) 22, a drive circuit 46 for an alarming buzzer 45, a drive circuit 48 for driving the thermal head 15, and a drive circuit 49 for driving the tape feed motor 47.

The controller C includes a CPU 52 and the input/output interface 50, a CGROM 53, ROMs 54 and 55, and a RAM 60 connected to the CPU 52 with a bus 51 such as a data bus.

The CGROM 53 stores dot pattern data for displaying each of a plurality of characters, correspondently to a plurality of code data inputtable through operation of the character keys, on the key board 3.

The ROM (dot pattern data memory) 54 stores dot pattern data for each of a plurality of characters, such as alphabetic characters and symbols, correspondently to the plurality of code data inputtable through operation of the character keys on the key board 3. The dot pattern data for each character is stored for each of the plurality of typefaces (such as Gothic type and Ming-cho type), at each of the seven print character sizes PS (16, 24, 32, 48, 64, 96, and 128 dot sizes).

The ROM 55 stores a display drive control program for controlling the display controller 23 in response to the code data of characters such as the alphabetical characters and numeric characters inputted from the keyboard 3, a printing drive control program for sequentially reading the data from a print buffer 64 and driving the thermal head 15 and the tape feed motor 47, and a control program, characteristic of this invention, for controlling the tape printing, which will be described later.

The ROM 55 stores a most suitable character size table TB1 in which, as shown in FIG. 5, tape widths of the print tape 19, corresponding printable widths PW (i.e., the widths of the printable areas on the corresponding print tape), and the most suitable character sizes related to them are indicated.

The ROM 55 further stores a standard character height table TB2, in which, as shown in FIG. 6, the standard character height SH of the alphabetic characters, i.e., the height (the number of dots) from the base line to the top alignment level, is given for each of the alphabetic characters (A–Z, a–z) at each of the seven characters sizes (16, 24, 32, 48, 64, 96, and 128 dots) stored in the ROM 54.

Although not shown in drawings, the ROM 55 further stores a standard character protrusion table, in which the standard character protrusion amount PA of the protruding alphabetic character, i.e., the amount (the number of dots) with which the protruded portion of the protruding alphabetic character protrudes downwardly from the base line to the bottom alignment level, is given for each of the protruding alphabetic characters "g", "j", "p" and "q" at each of the seven characters sizes (16, 24, 32, 48, 64, 96, and 128 dots). It is noted that in this example, the protrusion amounts PA for all the protruding characters of the same character size PS have the same values. For example, the protrusion amounts may be 5 dots for all the protruding characters of the character size of 16 dots.

In a text memory 61 of the RAM 60, document data (code data) inputted from the keyboard 3 is temporarily stored. In a text pointer (whose content is called the pointer value TP) 62, an address of the text memory 61 is stored. In a print character size memory 63, the data of the character size set for printing is stored.

In the print buffer 64, the dot pattern data for printing the characters constituting the inputted document data is temporarily stored as print data. In a flag memory 65, there are stored: flag data of an automatic setting flag AF to be set (data is "1") when an automatic setting mode is established, in which mode the print character size is automatically set according to the tape width of the print tape 19 to be obtained from the tape cassette CS actually loaded in the print mechanism PM; flag data of a non-protruding flag HF to be set when a non-protruding character which has no portions protruding down from the base line BL, such as capital letters A–Z and small letters a–f and k–o of the alphabets, is detected; and flag data of a printable flag PF to be set when a character is printable within the printable width of the print tape 19.

Routines for tape printing control executed in the controller C of the tape printing apparatus 1 will be described with reference to FIGS. 7–12. Reference characters Si (i=10, 11, 12, . . . ) in the flowcharts denote the steps.

The control is started when power is turned on with the power key, and if a key capable of being printed such as the alphabetic key, symbol key, and numeric key has been operated (S10, S11: Yes), a document data inputting process is executed for storing the code data of the operated key into the text memory 61 of the RAM 60 as document data. At the same time, a displaying process for displaying the character, corresponding to the code data on the display 22, is executed (S14), and the control returns to S10.

Then, if the size setting key has been operated for starting the setting operation of the print character size (S10: Yes; S11: No, S12: Yes), the character size setting process control (refer to FIG. 8) is executed (S15).

Figure 8:
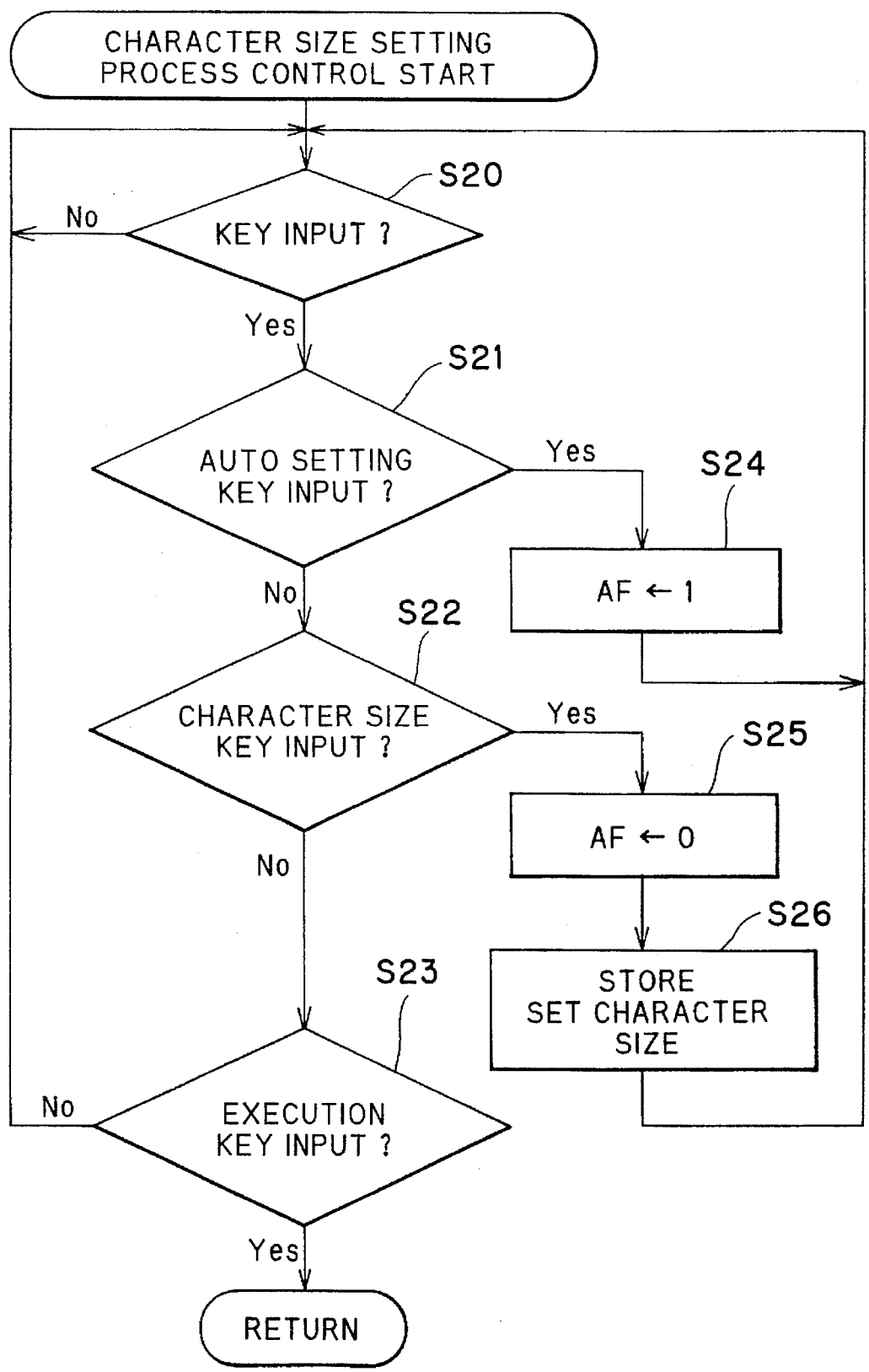
FIG. 8 is a schematic flowchart of a character size setting process control routine.

When this control is started, as shown in FIG. 8, if the automatic setting key has been operated (S20, S21: Yes), the automatic size setting mode is established and the automatic setting flag AF is set (S24), and the control returns to S20. On the other hand, when one of the six character size keys has been manually operated to set a desired character size from the printable six character sizes, 16, 24, . . . , 96 (S20: Yes; S21: No; S22: Yes), the automatic setting flag AF is reset (S25) and the data of the character size corresponding to the operated character size key is stored into the print character size memory 63 (S26), and the control returns to S20. When execution key is operated (S20: Yes; S21, S22: No; S23: Yes), this control ends and returns to S10 of the tape printing control of FIG. 7.

Afterwardly, when the print key has been operated (S10: Yes; S11, S12: No; S13: Yes), the printing process control (refer to FIG. 9) is executed (S16).

Figure 9:
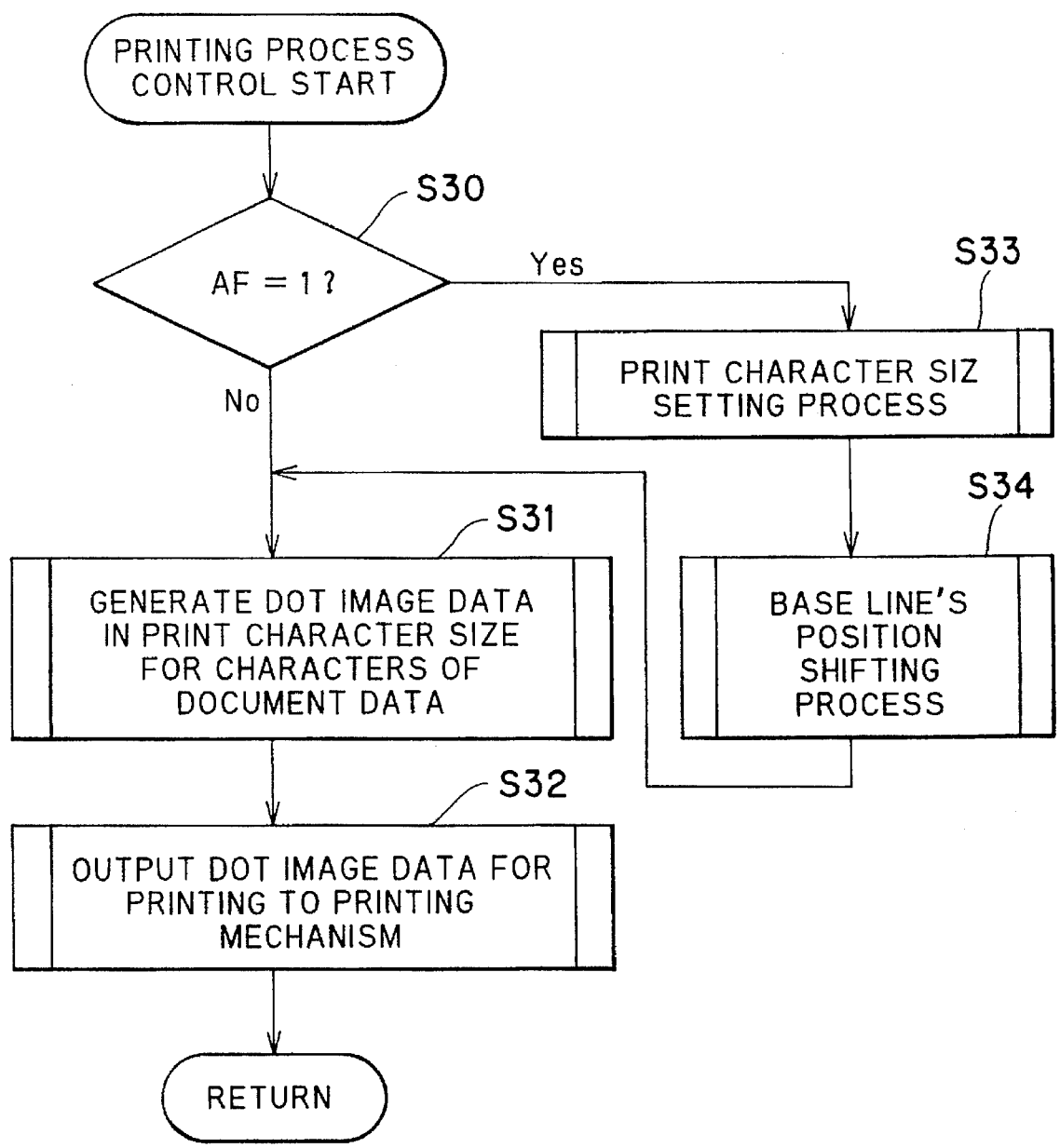
FIG. 9 is a schematic flowchart of a printing process control routine.
Figure 16:
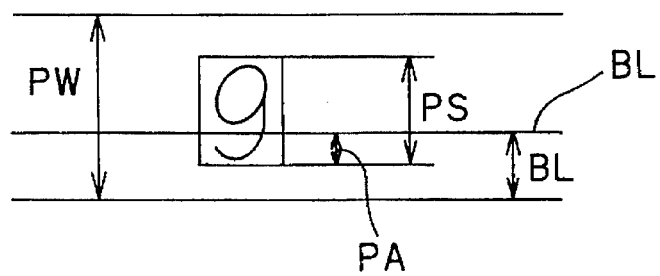
FIG. 16 is a diagram illustrating the manner of calculating the position of the base line in the manual size setting mode.

When this control is started, as shown in FIG. 9, if the automatic setting flag AF is not set, i.e., the manual size setting mode, not the automatic size setting mode, is set (S30: No), the dot pattern data corresponding to the print character size set in the print character size memory 63 is retrieved from the ROM 54 for each character of the document data stored in the text memory 61. Then, in S31, the base line BL is first determined, by calculation in accordance with the set character size, so as to be located somewhat lower than the center of the tape width. More specifically, as shown in FIG. 16, the position of the base line BL is calculated, by the following formula (1):

$$BL=(PW-PS)/2+PA \tag{1}$$

where BL represents a distance between the bottom level of the printable area in the tape and the base line and therefore represents the position of the base line, PW represents a printable width of the tape, PS represents the set character size, and PA represents a protrusion amount of the protruding characters at the set character size. This calculation is attained, regardless of whether the inputted characters include protruding characters or not.

The dot image data are then generated for the inputted document data, on the basis of the thus calculated base line BL, and stored into the print buffer 64. Then, the dot image data for printing stored in the print buffer 64 are outputted to the printing mechanism PM (S32), in which printing operation is performed. More specifically, the dot image data are retrieved sequentially from the print buffer 64, and the thermal head 15 is driven in accordance with the thus retrieved dot image data while the tape feed motor 47 is driven to rotate the Joining roller 14 and the take-up spool 11. Then, the control ends and returns to S10.

Figure 13:
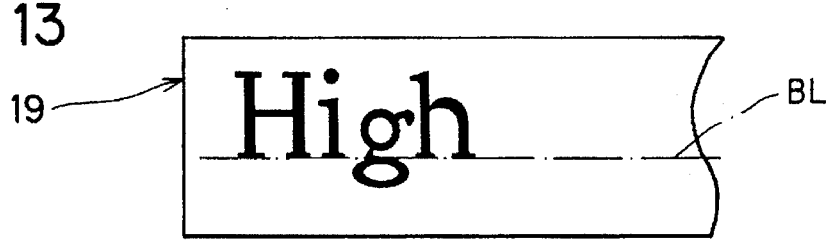
FIG. 13 is a diagram showing an example of a printed document including a protruding character printed in the manual size setting mode.
Figure 14:
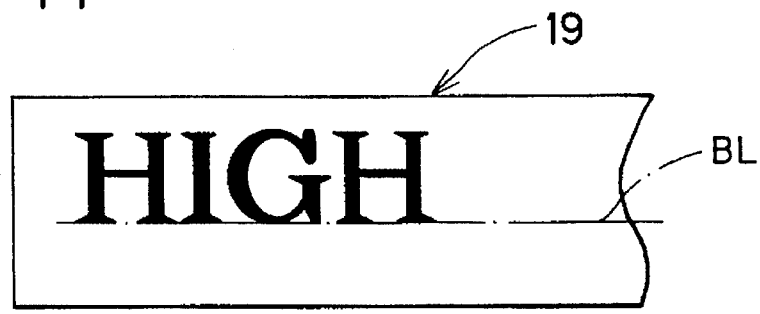
FIG. 14 is a diagram showing an example of a printed document formed of non-protruding characters printed in the manual size setting mode.

Now assume that a tape cassette CS containing a tape with a tape width of 24 mm is loaded in the printing mechanism PM and the character size is manually set to 96 dots. If a train of characters "High" including a protruding character "g" are inputted as the document data, as shown in FIG. 13, the position of the base line BL is calculated by the formula (1) on the basis of the selected print character size PS, to be located at a regular position which is somewhat lower than the center of the tape width. Accordingly, the train of characters "High" are printed on the tape 19 just on the regular base line BL. On the other hand, if a train of characters "HIGH" made up of only non-protruding characters are inputted, the base line BL is calculated also by the formula (1) on the basis of the selected print character size PS. Accordingly, the base line BL is located at the same regular position as that obtained in the case where the characters "high" are inputted. Accordingly, the train of characters "HIGH" are printed on the print tape 19 as shown in FIG. 14, also just on the regular base line BL. Thus, in this case, there is left a large space under the base line BL.

On the other hand, when the printing process control of FIG. 9 is started, if the automatic setting flag AF is set and, hence, the automatic size setting mode is established (S30: Yes), the print character size setting process control (refer to FIG. 10) is executed (S33).

Figure 10:
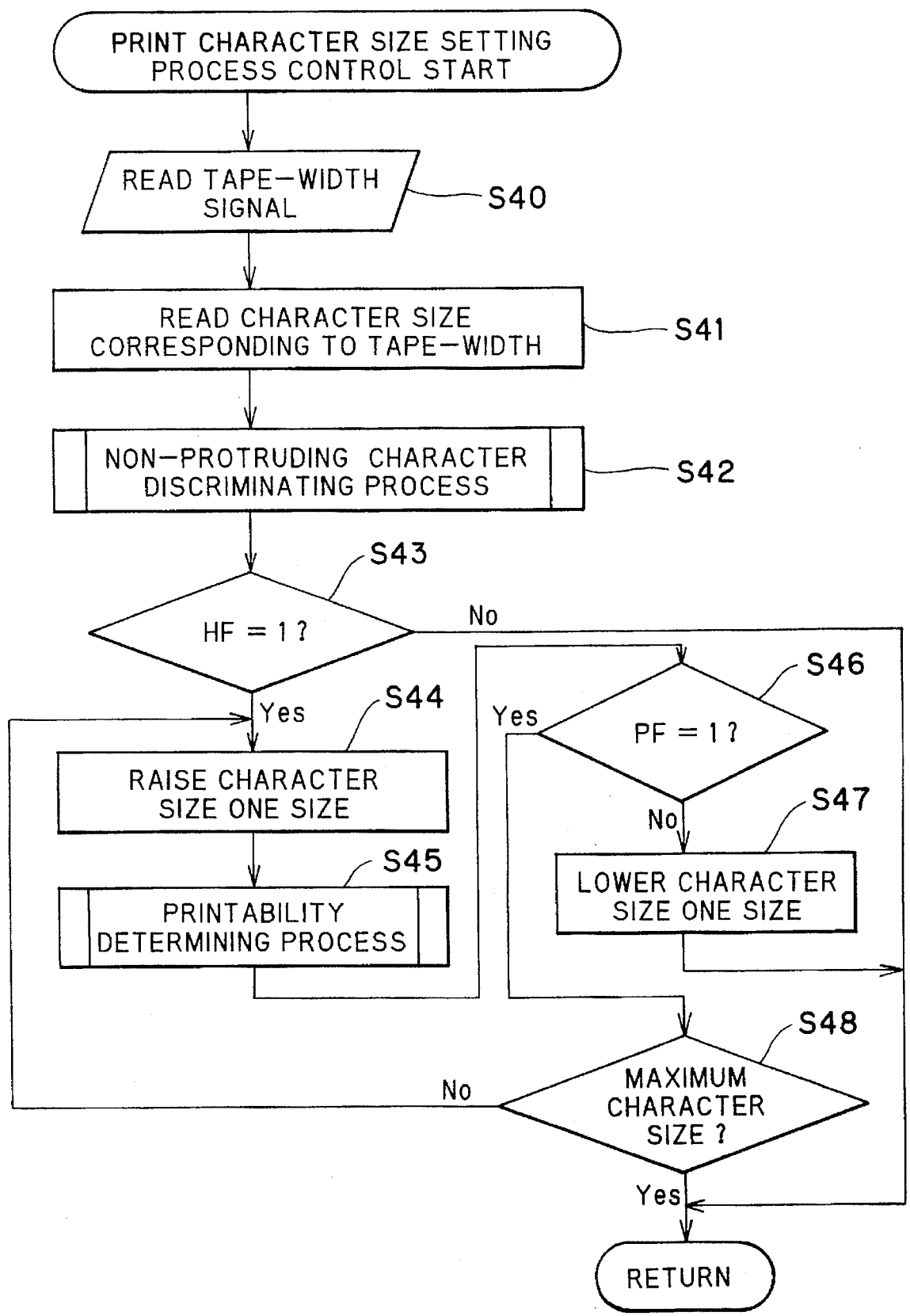
FIG. 10 is a schematic flowchart of a print character size setting process control routine.

When this control is started, as shown in FIG. 10, the tape-width signal outputted from the tape-width sensor 43 is read out (S40). The tape-width signal represents a width of a tape 19 to be obtained from the tape cassette CS which is actually loaded in the print mechanism PM. Then, the most suitable character size corresponding to the tape width represented by the tape-width signal is read out from the most suitable character size table TB1, and stored into the print character size memory 63 (S41). Then, the non-protruding character discriminating process control (refer to FIG. 11) for the characters of the inputted document data is executed (S42).

Figure 11:
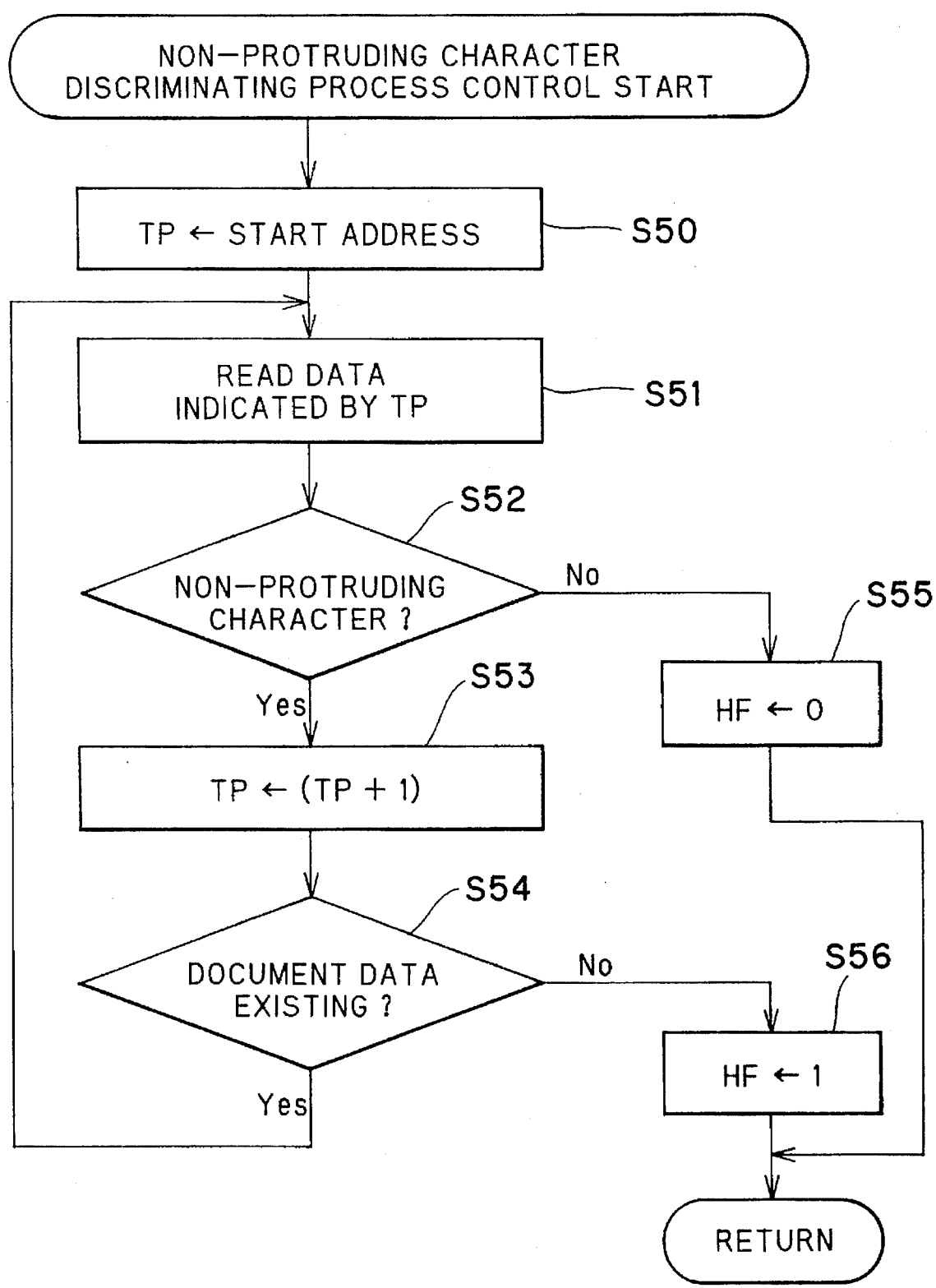
FIG. 11 is a schematic flowchart of a non-protruding character discriminating process control routine.

When this control is started, as shown in FIG. 11, the start address of the text memory 61 is stored into the text pointer TP (S50), and the character code data at the address indicated by the text pointer TP is read out (S51). Then, if the character is non-protruding character according to the code data (S52: Yes), the text pointer TP is incremented by 1 (S53), and if the data at the address indicated by the text pointer TP is not the text end code but there is still present document data (S54: Yes), the control returns to S51.

If the character at the address indicated by the text pointer TP is not a non-protruding character, i.e., it is a character protruding down from the base line such as the alphabetic characters "g, j, p, q" (S52: No), a non-protruding flag HF is reset (S55), and the control ends and returns to S43 of the print character size setting process control of FIG. 10. On the other hand, when all of the characters constituting the document data are non-protruding characters (S51; S52: Yes; S53; S54: No), the non-protruding flag HF is set (S56), and the control ends and returns to step S43 of FIG. 10.

Then, in step S43 of the print character size setting process control of FIG. 10, if the non-protruding flag HF has been set, i.e., all of the characters constituting the document data are non-protruding characters (S43: Yes), the character size one size over the character size that has been retrieved from the most suitable character size table TB1 is newly set, and the thus updated data is stored into the print character size memory 63 (S44). Then, the printability determining process control (refer to FIG. 12) for determining whether the printing is possible is executed (S45).

Figure 12:
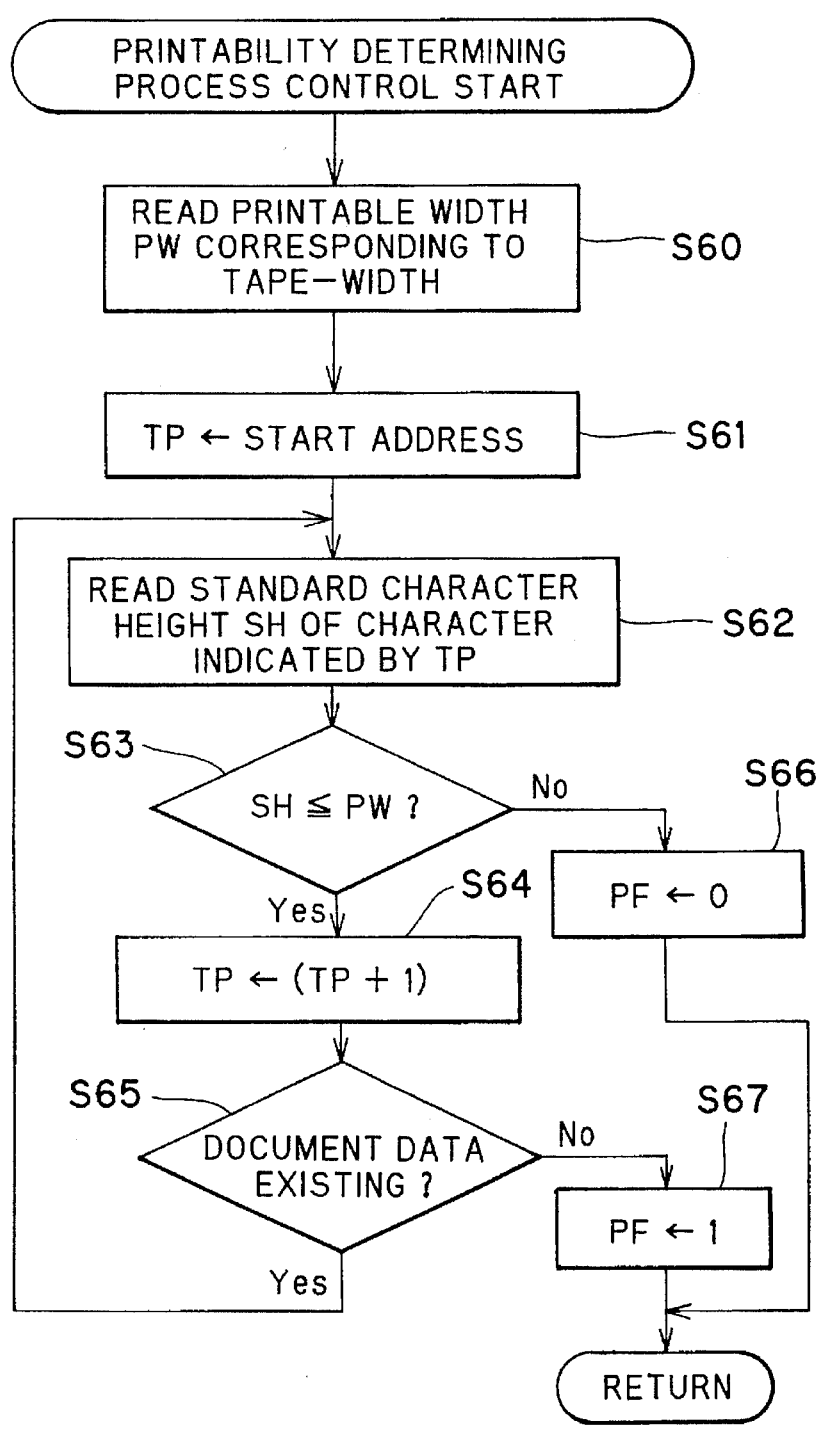
FIG. 12 is a schematic flowchart of a printability determining process control routine.

When this control is started, as shown in FIG. 12, the printable width PW corresponding to the tape width represented by the tape-width signal is read according to the data in the most suitable character size table TB1 (S60). Then, the start address of the text memory 61 is stored into the text pointer TP (S61), and the standard character height SH corresponding to the character code at the address indicated by the text pointer TP for the character size stored in the print character size memory 63 is read out from the standard character height table TB2 (S62).

Then, if the standard character height SH is equal to or smaller than the printable width PW, i.e., it is printable (S63: Yes), the text pointer TP is incremented by 1 (S64). Then, if the data at the address indicated by the text pointer TP is not the text end code but there is still present document data (S65: Yes), the control returns to S62.

On the other hand, if the standard character height SH of the character code at the address indicated by the text pointer TP is greater than the printable width PW, then, the character is not printable (S63: No). Hence, the printable flag PF is reset (S66), and the control ends and returns to S46 of the print character size setting process control of FIG. 10.

If all of the characters constituting the document data are printable (S62; S63: Yes; S64; S65: No), the printable flag PF is set (S67), and this control ends and returns to S46 of FIG. 10.

Then, in S46 of the print character size setting process control, if the printable flag PF is set, i.e., all of the characters constituting the document data are printable (S46: Yes), and if the character size stored in the print character size memory 63 is not the maximum character size (i.e., the 128 dot size) (S48: No), S44 and following processes are repeatedly executed.

When, as the result of the printability determining process in S45, the printable flag PF is reset and, hence, the document data cannot be printed (S46: No), the character size one size under is set, its updated data is stored into the print character size memory 63 (S47), and the control ends and returns to S34 of the printing process control of FIG. 9.

When, as the result of the printability determining process, the printable flag PF is set and, hence, the document data can be printed, and if the character size set is the maximum size (S48: Yes), the control equally ends and returns to the step S34.

Then, in the printing process control of FIG. 9, in order to arrange the dot pattern of the characters and symbols of the inputted document data in the print buffer 64, the position of the base line BL is calculated in S34 such that the upper margin and the lower margin become virtually equal, in accordance with the printable width PW corresponding to the tape width and the finally set print character size PS.

Figure 17:
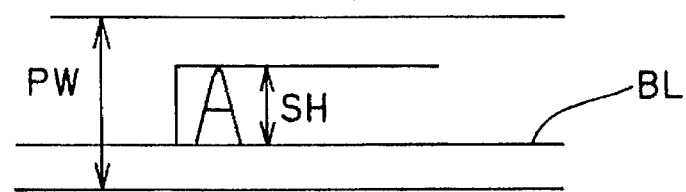
FIG. 17 is a diagram illustrating the manner of calculating the position of the base line in the automatic size setting mode.

More specifically, in the case where the characters desired to be printed include at least one protruding character, the position of the base line BL is obtained through calculating the above-described formula (1) with using the most suitable character size for the tape width as the character size PS appearing in the formula. On the other hand, in the case where the inputted characters include only non-protruding characters, as shown in FIG. 17, the position of the base line BL is calculated by the following formula (2):

$$BL=(PW-SH)/2 \qquad (2)$$

where BL represents a distance between the bottom level of the printable area in the tape and the base line and therefore represents a position of the base line, PW represents a printable width of the tape, and SH represents the height, from the base line to the top alignment level, of the characters of the presently-set printable maximum character size. According to this formula (2), the base line is located at a lower level, relative to the level that will be possibly obtained by the formula (1) with the presently-set printable maximum character size. According to this formula (2) thus shifting the base line to a lower level, the upper margin and the lower margin become virtually equal for the inputted document data thus constructed only by the non-protruding characters.

Then, the dot image data of the document data is generated on the basis of the shifted base line BL, and stored into the print buffer 64 (S31). The dot image data for printing in the print buffer 64 are output to the printing mechanism PM (S32), where printing operation is performed. More specifically, the dot image data are retrieved sequentially from the print buffer 64, and the thermal head 15 is driven in accordance with the thus retrieved dot image data while the tape feed motor 47 is driven to rotate the joining roller 14 and the take-up spool 11. Then, the control ends and returns to S10.

Figure 15:
FIG. 15 is a diagram showing an example of printed document formed of non-protruding characters printed in the automatic size setting mode.

Now, assume that a tape cassette CS containing a tape with a width of 24 mm is loaded into the printing mechanism PM, the automatic size setting mode is established, and a train of non-protruding characters "HIGH" are inputted as the document data. It is noted that the character size most suitable to the tape width of 24 mm is 96 dot size according to the table TB1. However, even if the maximum character size 128 dots, one size greater than the 96 dot size, is set, the standard character heights of all the characters "H", "G", "I" and "H" shown in the table TB2 for the character size 128 dots are still smaller than the printable width, 96 dots, of the 24 mm tape width. Accordingly, the 128 dot size is finally set as the greatest printable character size and at the same time, the base line BL is shifted to a lower level through the calculation of the formula (2). Thus, the train of characters "HIGH" are printed on the print tape 19 in the print character size of 128 dots as shown in FIG. 15, with the upper and lower margins being equally left. Thus, the characters "HIGH" of large size are excellently located around the center of the width of the tape, and appear nice.

As described above, after the document data have been inputted by operating character keys, if an automatic setting key is operated to allow the print character size to be set automatically and a print key is then operated, printing process control is executed. If all the characters of the document data are non-protruding characters, the greatest character size printable on a tape mounted in the tape printing apparatus is set (S33). A base line position shifting process is performed so that the printed character is positioned around the center of the width of the tape (S34). Then, dot image data in the print character size that is set on the basis of the document data is generated (S31) and the dot image data is output to the printing mechanism to be printed on the tape (S32).

Thus, when all of the characters of the document data formed of input alphabetic characters and symbols are non-protruding characters such as the train of characters "HIGH", the dot image data for printing is generated for the document data and printed with the base line BL shifted to a lower level so that no excessive margin is left under the base line BL. Accordingly, the document formed of only non-protruding characters can be printed with the tape width effectively used, not leaving an excessive margin, to thereby look nice and in as great a character size as possible.

While the invention has been described in detail with reference to specific embodiments thereof, it would be apparent to those skilled in the art that various changes and modifications may be made therein without departing from the spirit of the invention.

For example, instead of the standard character height table TB2, such a table, in which each of the character sizes and the non-protruding character printable in the character size are shown related to each other, may be used. Instead of specially providing the automatic size setting mode, such an arrangement may be made that, when a document including only non-protruding characters is to be printed, the document is printed at all times in the tape width of the print tape 19 in as great a print character size as possible.

As a matter of course, the invention can be applied to various tape printing apparatuses having fonts of outline data of characters and symbols and capable of printing documents of Western languages such as Germany and French on tape-formed printing media.

In the above description, some small letters of alphabetic characters such as "g" and "j" are described as examples for the protruding characters. However, various characters may have protruding characters, which have portions protruding down from the base line, and non-protruding characters, which have no portions protruding down from the base line.

What is claimed is:

1. A tape printing apparatus for printing a desired character onto a tape having a tape width, the apparatus comprising:

input means for inputting code data indicative of at least one character desired to be printed on a tape and various commands;

data storage means for temporarily storing the inputted code data of the desired at least one character;

font storage means for storing data indicative of shapes of a number of characters, code data of which are inputtable by the input means, in plural classes of character sizes;

character identifying means for identifying whether all the desired at least one character stored in said data storage means is a non-protruding character which has no portions that are to protrude down from a base line;

print character size setting means for receiving the result by said character identifying means for setting a character size predetermined for the tape width of the tape, if at least one of the desired at least one character stored in said data storage means is a protruding character which has a portion that is to protrude down from the base line and for setting a character size greater than the predetermined character size and printable in the tape having the tape width, if all the desired at least one character stored in said data storage means is a non-protruding character as determined by the character identifying means;

print data generation means for generating dot image data for printing, on the basis of the code data stored in said data storage means, the character size set by the print character size setting means and the data stored in said font storage means; and print means for receiving the dot image data for printing from said print data generation means and for printing the data on tape, wherein the print character size setting means sets the character size greater than the predetermined character size and printable in the tape having the tape width, when all the desired at least one character is a non-protruding character, regardless of whether the desired at least one character includes a small letter.

2. A tape printing apparatus of claim 1, further comprising base line position calculation means for calculating a position of a base line, on which the desired at least one character is to be located, based on the character size set by the print character size setting means, so that an upper margin and a lower margin to be left above and below the desired at least one character become substantially equal to each other, wherein the print data generation means generates the dot image data for printing, on the basis of the calculated base line position, the code data stored in said data storage means, the character size set by the print character size setting means, and the data stored in said font storage means.

3. A tape printing apparatus of claim 2, further comprising:

a tape cassette receiving means for receiving a tape cassette containing a tape with a tape width; and tape-width detection means for detecting the tape width of the tape contained in the tape cassette actually received in the tape cassette receiving means;

wherein the print character size setting means sets the greatest character size printable in the tape width detected by said tape-width detection means when all the desired at least one character stored in said data storage means is detected to be the non-protruding character.

4. A tape printing apparatus of claim 3, wherein the tape cassette has a projecting piece formed with at least one projecting claw representing the information on the tape width, and wherein the tape-width detection means includes at least one photocoupler for receiving the at least one projecting claw of the tape cassette to thereby detect the tape width of the tape contained in the tape cassette.

5. A tape printing apparatus of claim 1, further comprising manual setting means for manually setting a character size, with which the inputted at least one character is desired to be printed on the tape, the manual setting means causing the print data generation means to generate dot image data for printing, on the basis of the code data stored in said data storage means, the character size manually set by the manual setting means and the data stored in said font storage means.

6. A tape printing apparatus of claim 5, further comprising another base line position calculation means for calculating a position of a base line, on which the desired at least one character is to be located, based on the character size set by the manual setting means, wherein the print data generation means generates the dot image data for printing, on the basis of the calculated base line position, the code data stored in said data storage means, the character size set by the manual setting means, and the data stored in said font storage means.

7. A tape printing apparatus of claim 1, wherein the input means inputs code data indicative of at least one alphabetic letter desired to be printed on the tape, the font storage means storing data indicative of shapes of a number of alphabetic letters, code data of which are inputtable by the input means, in plural classes of character sizes, and where the character identifying means identifies whether all the desired at least one alphabetic letters stored in said data storage means is a non-protruding letter which has no portions that are to protrude down from a base line, the print character size setting means setting the greatest character size printable in a tape having a tape width, if all the desired at least one alphabetic letters stored in said data storage means is a non-protruding letter.

8. A tape printing apparatus of claim 1, wherein the font storage means stores dot pattern data of a number of characters, code data of which are inputtable by the input means, in plural classes of character sizes.

9. A tape printing apparatus of claim 1, wherein the font storage means stores outline data of a number of characters, code data of which are inputtable by the input means, in plural classes of character sizes.

10. A tape printing apparatus of claim 1, wherein the character identifying means includes character judging means for judging whether all the desired at least one character stored in said data storage means is a non-protruding character, the print character size setting means receiving the result by said character judging means, setting the predetermined character size, if at least one of the desired at least one character stored in said data storage means is a protruding character, and setting the character size greater than the predetermined character size and printable in the tape having the tape width, if all the desired at least one character stored in said data storage means is a non-protruding character.

11. A tape printing apparatus of claim 1, wherein the print character size setting means sets the greatest character size printable in the tape having the tape width, if all the desired at least one character stored in said data storage means is a non-protruding character.

12. A tape printing apparatus of claim 11, further comprising base line position calculation means for calculating a position of a base line, on which the desired at least one character is to be located, based on the greatest character size set by the print character size setting means, so that an upper margin and a lower margin to be left above and below the desired at least one character become substantially equal to each other.

13. A tape printing apparatus of claim 12, wherein the base line position calculation means calculates the position of the base line by the following formula:

$$BL=(PW-SH)/2$$

where BL represents a distance between a bottom level of a printable area in the tape and the base line, PW represents a printable width of the tape, and SH represents the height, from the base line to the top alignment level, of the desired at least one character of the greatest character size.

14. A tape printing apparatus of claim 6, wherein the other base line position calculation means calculates the position of the base line by the following formula:

$$BL=(PW-PS)/2+PA$$

where BL represents a distance between a bottom level of a printable area in the tape and the base line, PW represents a printable width of the tape, PS represents the manually set character size, and PA represents a protrusion amount of protruding characters at the set character size.

15. A tape printing apparatus of claim 1, further comprising character size storage means for storing character sizes in correspondence with a plurality of tape widths, each of the plurality of character sizes being determined to be appropriate for printing both protruding characters and non-protruding characters in a tape with a corresponding tape width, wherein the print character size setting means selects the character size determined appropriate for the tape width of the tape, if at least one of the desired at least one character is a protruding character, and changes the determined character size into a greater character size printable in the tape having the tape width, if all the desired at least one character is a non-protruding character.

16. A tape printing apparatus for printing desired characters onto a tape, the apparatus comprising:

an input unit for inputting data of at least one character desired to be printed on a tape and various commands;

a data memory for temporarily storing the inputted data of the at least one character;

a font memory for storing data indicative of shapes, in plural classes of character sizes, of a number of characters, data of which are inputtable by the input unit;

a character size setting mode for manually setting a character size, with which the at least one character is desired to be printed, and an automatic setting mode for automatically setting the character size;

a tape-width detection unit for detecting a tape width of a tape, onto which the at least one character is desired to be printed, the tape-width detection unit being operated only in the automatic setting mode;

a character discrimination unit for discriminating between non-protruding characters and protruding characters among the at least one character stored in said data memory, the character discrimination unit being operated only in the automatic setting mode;

an automatic character size setting unit for receiving the result of discrimination from said character discrimination unit and for setting the greatest character size printable in the tape width detected by said tape-width detection unit when the at least one character stored in said data storage means are all non-protruding characters as determined by the character discriminating unit, the automatic character size setting unit being operated only in the automatic setting mode;

a base line calculation unit for calculating a position of a base line, on which the at least one character is to be located, on the basis of the character size set either in the selected manual setting mode and in the automatic setting mode by the automatic character size setting unit;

a print data generation unit for generating dot image data for the inputted at least one character, on the basis of the character size set either in the selected manual setting mode and in the automatic setting mode by the automatic character size setting unit, the calculated base line, the data stored in said data memory and the data stored in said font memory; and a print unit for receiving the dot image data for printing from said print data generation unit and for printing the data on the tape, wherein the automatic character size setting unit sets the greatest character size printable in the tape width when the at least one character are all non-protruding characters, regardless of whether the at least one character include a small letter.

17. A tape printing apparatus for printing a desired character onto a tape with a tape width, the apparatus comprising:

input means for inputting code data indicative of at least one character desired to be printed on a tape and various commands;

data storage means for temporarily storing the inputted code data of the desired at least one character;

font storage means for storing data indicative of shapes of a number of characters, code data of which are inputtable by the input means, in plural classes of character sizes;

character identifying means for identifying whether all the desired at least one character stored in said data storage means is a non-protruding character which has no portions that are to protrude down from a base line;

setting means for receiving the result by said character identifying means, for setting a character size predetermined for the tape width of the tape, if at least one of the desired at least one character stored in said data storage means is a protruding character which has a portion that is to protrude down from the base line as determined by the character identifying means, and for performing, if all the desired at least one character stored in said data storage means is a non-protruding character, either one of setting of a character size greater than the predetermined character size and printable in the tape having the tape width and setting of a position of a base line, on which the desired at least one character is to be located with an upper margin and a lower margin left above and below the desired at least one character being substantially equal to each other;

print data generation means for generating dot image data for printing, on the basis of the code data stored in said data storage means, the data stored in said font storage means, and one of the character size and the position of the base line set by the setting means; and print means for receiving the dot image data for printing from said print data generation means and for printing the data on the tape, wherein the setting means performs either one of the setting of the greater character size and the setting of the position of the base line, when all the desired at least one character is a non-protruding character, regardless of whether the desired at least one character include a small letter.

18. A tape printing apparatus of claim 17, wherein the print character size setting means performs either one of setting of the greatest character size printable in the tape having the tape width and setting of the position of the base line, on which the desired at least one character is to be located with an upper margin and a lower margin left above and below the desired at least one character being substantially equal to each other, if all the desired at least one character stored in said data storage means is a non-protruding character.

19. A tape printing apparatus of claim 18, wherein the setting of the position of the base line sets a distance between the base line and a bottom level of a printable area in the tape to be equal to a distance between a top level of the printable area in the tape and a top alignment level of the desired at least one character.

20. A tape printing apparatus of claim 19, further comprising:

a tape cassette receiving means for receiving a tape cassette containing the tape with the tape width; and tape-width detection means for detecting the tape width of the tape contained in the tape cassette received in the tape cassette receiving means;

character size storage means for storing character sizes in correspondence with a plurality of tape widths, each of the plurality of character sizes being determined to be appropriate for printing both protruding characters and nonprotruding characters in a tape with a corresponding tape width, wherein the setting means sets the character size determined appropriate for the tape width of the tape, if at least one of the desired at least one character is a protruding character, the setting means performing the setting of the greater character size through changing the determined character size into a greater character size printable in the tape having the tape width, if all the desired at least one character is a non-protruding character.

21. A tape printing apparatus for printing a desired character onto a tape, the apparatus comprising:

input means for inputting code data indicative of at least one character desired to be printed on a tape and various commands;

data storage means for temporarily storing the inputted code data of the desired at least one character;

font storage means for storing data indicative of shapes of a number of characters, code data of which are inputtable by the input means, in plural classes of character sizes;

character identifying means for identifying whether all the desired at least one character stored in said data storage means is a non-protruding character which has no portions that are to protrude down from a base line;

base line calculating means for receiving the result by said character identifying means and for calculating a position of a base line, on which the desired at least one character is to be located with an upper margin and a lower margin left above and below the desired at least one character being substantially equal to each other, if all the desired at least one character stored in said data storage means is a non-protruding character as determined by the character identifying means;

print data generation means for generating dot image data for printing, on the basis of the code data stored in said data storage means, the data stored in said font storage means, and the position of the base line calculated by the base line calculating means; and print means for receiving the dot image data for printing from said print data generation means and for printing the data on the tape, wherein the base line calculating means calculates the position of the base line, when all the desired at least one character is a non-protruding character, regardless of whether the desired at least one character include a small letter.

22. A tape printing apparatus of claim 21, wherein the base line calculating means, if all the desired at least one character is a non-protruding character, calculates the position of the base line so that a distance between the base line and a bottom level of a printable area in the tape is equal to a distance between a top level of the printable area in the tape and a top alignment level of the desired at least one character.

23. A tape printing apparatus of claim 22, wherein the base line calculating means, if all the desired at least one character is a non-protruding character, calculates the position of the base line by the following formula:

$$BL=(PW-SH)/2$$

where PW represents a printable width of the tape, SH represents the height, from the base line to a top alignment level, of the desired at least one character of a character size, and BL represents a distance between the bottom level of the printable area in the tape and the base line.

24. A tape printing apparatus of claim 23, wherein the base line calculating means, if at least one of the desired at least one character is a protruding character, calculates the position of the base line by the following:

$$BL=(PW-PS)/2+PA$$

where PS represents the character size of the desired at least one character and PA represents a protrusion amount of the protruding characters.

* * * * *